(12) United States Patent
Shigeno

(10) Patent No.: US 7,362,796 B2
(45) Date of Patent: Apr. 22, 2008

(54) SIGNAL RELAY CIRCUIT FOR SECURING AMPLITUDE OF VOLTAGE OF TRANSMITTING SIGNALS

(75) Inventor: Takahide Shigeno, Minato-ku (JP)

(73) Assignee: NEC Corporation, Tokyo (JP)

( * ) Notice: Subject to any disclaimer, the term of this patent is extended or adjusted under 35 U.S.C. 154(b) by 801 days.

(21) Appl. No.: 10/771,473

(22) Filed: Feb. 5, 2004

(65) Prior Publication Data

US 2004/0160289 A1   Aug. 19, 2004

(30) Foreign Application Priority Data

Feb. 19, 2003   (JP) .............................. 2003-041192

(51) Int. Cl.
*H03K 11/00* (2006.01)

(52) U.S. Cl. ...................................... 375/214

(58) Field of Classification Search .............. 375/214, 375/224, 319; 324/676, 679; 330/277, 269
See application file for complete search history.

(56) References Cited

U.S. PATENT DOCUMENTS

2001/0026160 A1* 10/2001 Orii ........................... 324/679

2002/0070807 A1* 6/2002 Yamamoto .................. 330/277

FOREIGN PATENT DOCUMENTS

| JP | 55-41077 A | 3/1980 |
|---|---|---|
| JP | 7-170167 A | 7/1995 |
| JP | 10-173510 A | 6/1998 |
| JP | 10-303726 A | 11/1998 |
| JP | 11-215162 A | 8/1999 |
| JP | 2002-354053 A | 12/2002 |

* cited by examiner

*Primary Examiner*—Khai Tran
(74) *Attorney, Agent, or Firm*—Sughrue Mion, PLLC

(57) ABSTRACT

In a signal relay circuit according to the present invention, while a capacitor serves to pass an AC component of a digital signal having a first potential level and a second potential level higher than the first potential level, a first resistor and a second resistor serve to secure an amplitude of voltage of the digital signal between the first potential level and the second potential level as received from the capacitor.

4 Claims, 2 Drawing Sheets

SIGNAL RELAY CIRCUIT FOR SECURING AMPLITUDE OF VOLTAGE OF TRANSMITTING SIGNALS

BACKGROUND OF THE INVENTION

1. Field of the Invention

The present invention is related to a signal relay circuit for relaying digital signals such as clock signals.

2. Description of the Related Art

As illustrated in FIG. 1, a prior art signal relay circuit comprises buffer IC (Integrated Circuit) 11 which receives a clock signal from driver IC 1, serving as a signal generating unit, through transmission line 10 and outputs the clock signal to receiver IC 7, serving as a signal receiving unit, through transmission line 12. The length of the transmission line for clock signal transmission is limited due to the driving capacity of driver IC 1. For this reason, in the case of the prior art signal relay circuit, buffer IC 11 is provided in the middle of the transmission line in order to extend the transmission distance of the clock signal.

Common mode noise is generated in such a structure having a buffer IC in the middle of a transmission line because of a through-current passed through the driver IC and the buffer IC. If common mode noise flows into an electric power source or a ground, then it is likely that the malfunction of another circuit or EMI (Electromagnetic Interference) will occur. Also, the costs required for implementing equipment such as a server system often increase by the use of such an expensive buffer IC.

Incidentally, Japanese Patent Laid-open Publication No. 170167/95 discloses a structure of a level shifter for AC signals for the purpose of eliminating self-exciting oscillation, comprising a capacitor and two resistors at the connection point between the capacitor and an inverter.

SUMMARY OF THE INVENTION

It is an object of the present invention to provide a signal relay circuit for relaying signals without the problems relating to high-cost and common mode noise due to the buffer IC for relaying signals.

The signal relay circuit of an embodiment of the present invention includes a capacitor provided in the middle of a transmission line to connect a signal generating unit with a signal receiving unit, a first resistor which is connected between a power supply and a relay point between the capacitor and the signal receiving unit, and a second resistor which is connected between a ground potential and the relay point.

In the signal relay circuit according to the present invention, while a capacitor serves to pass an AC (Alternating Current) component of a digital signal having a first potential level and a second potential level higher than the first potential level, the first resistor and the second resistor serve to secure an amplitude of voltage of a restored digital signal between the first potential level and the second potential level as received from the capacitor.

The first resistor has such a resistance value that the output current passed through the first resistor is smaller than the output current of the first potential level from a signal generating unit, and then the first potential level of the restored digital signals can be detected by a signal receiving unit.

On the other hand, the second resistor has such a resistance value that the output current passing through the second resistor is smaller than a current output of the second potential level from a signal generating unit, and then the second potential level of the restored digital signals can be detected by the signal receiving unit.

Furthermore, the resistance value of the second resistor was selected in order that the maximum value of the first potential level is not exceeded by the voltage drop due to a leakage current that is flowing from the signal receiving unit into the ground potential, and then the first potential level of the restored digital signals can be detected by the signal receiving unit.

It is therefore possible, even without a buffer IC, to transmit signals with a sufficient amplitude as secured and reduce equipment costs such as server system costs and the like as compared with prior art devices. Also, it is possible to reduce a through-current and inhibit the generation of common mode noise since no buffer IC is provided in the middle of a transmission line. Because of this, the extension of the transmission line is possible which is indispensable in the case of a multiple board system such as a server system.

The above and other objects, features and advantages of the present invention will become apparent from the following description with is reference to the accompanying drawings which illustrate examples of the present invention.

DETAILED DESCRIPTION OF THE PREFERRED EMBODIMENT

Figure 1:
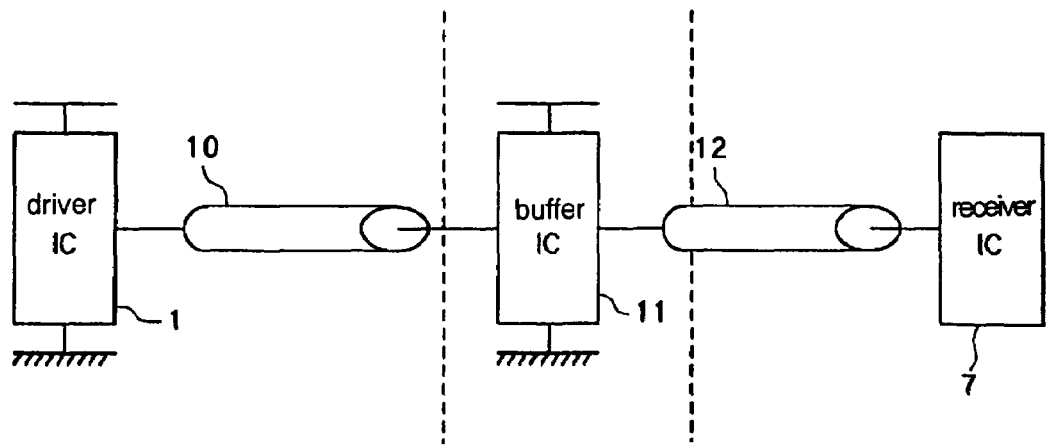
FIG. 1 is a block diagram showing a prior art example of a signal relay circuit.
Figure 2:
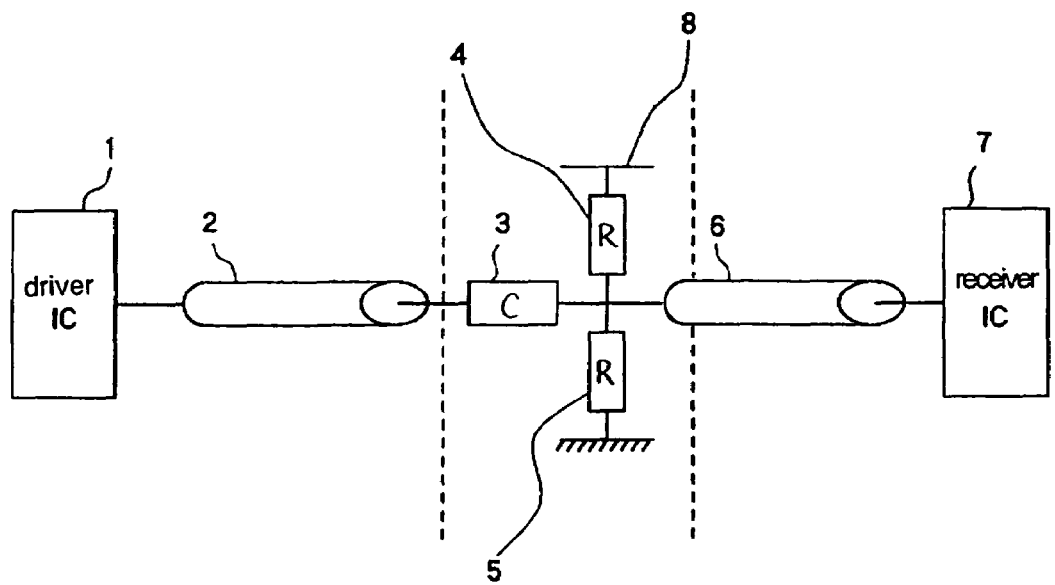
FIG. 2 is a circuit diagram showing a first embodiment of the present invention.

As illustrated in FIG. 2, a signal relay circuit of an embodiment of the present invention includes capacitor 3 for receiving a clock signal from driver IC 1 through transmission line 2 and generating a restored clock signal as an AC signal by the AC coupling of the clock signal as received, and resistors 4 and 5 for adjusting the amplitude of voltage of the restored clock signal suitable for reception by receiver IC 7 serving as a signal receiving unit. In this embodiment of the present invention, the digital signal to be transmitted is the clock signal. This clock signal comprises a low level as a first potential level and a high level as a second potential level.

Transmission line 2 has its one end connected to the output terminal of driver IC 1, and the other end connected to one terminal of capacitor 3 as illustrated in FIG. 2. The other terminal of capacitor 3 is connected to one end of transmission line 6. The other end of transmission line 6 is connected to the input terminal of receiver IC 7. One terminal of resistor 4 and one terminal of resistor 5 are connected to the relay point between capacitor 3 and transmission line 6. The other terminal of resistor 4 is connected to power supply 8, which serves to supply the same potential as the power source potential Vcc of receiver IC 7, and is applied the potential Vcc. On the other hand, the other terminal of resistor 5 is connected to ground potential.

Capacitor 3 serves to eliminate the DC (Direct Current) component of the clock signal as received from driver IC 1 through transmission line 2.

The resistance value of resistor 4 is selected in order that the current passed therethrough may be smaller than low level output current $I_{OL}$ from driver IC 1. This is because the low level signal as output from driver IC 1 has to be transmitted to transmission line 6 through the above relay point. Resistance value R4 of resistor 4 satisfies the following relational equation with power supply voltage Vcc and output current $I_{OL}$, $$I_{OL} > (Vcc/R4) \tag{1}$$

The resistance value of resistor 5 is selected in order that the current passed therethrough may be smaller than high level output current $I_{OH}$ from driver IC 1. This is because the high level signal as output from driver IC 1 has to be transmitted to transmission line 6 through the above relay point. Resistance value R5 of resistor 5 satisfies the following relational equation with voltage Vdd applied to driver IC 1 and output current $I_{OH}$, $$I_{OH} > (Vdd/R5) \tag{2}$$

Also, resistance value R5 of resistor 5 is selected to such a value that, even if small leakage current $I_R$ flows into ground potential from the power source of receiver IC 7 through transmission line 6, the potential at the above relay point may not be pulled up to exceed the maximum value Vrmax of the potential Vr which can be judged by receiver IC 7 to be the low level. Resistance value R5 of resistor 5 satisfies the following relational equation with Vrmax and $I_R$, $$Vrmax \geq R5 \times I_R \tag{3}$$

From above equations (2) and (3), resistance value R5 satisfies the following relational equation, $$(Vdd/I_{OH}) < R5 \leq (Vrmax/I_R) \tag{4}$$

Furthermore, for the purpose of securing a sufficient amplitude of voltage between the high level and the low level, voltage value Vth which is the middle of the amplitude of voltage has to satisfy the following relational equation with resistance values R4 and R5 and power supply voltage Vcc, $$Vth = Vcc/2 = \{R5/(R4+R5)\}Vcc \tag{5}$$

$$R4 = R5 \tag{6}$$

By selecting resistor 4 and resistor 5 as described above, it is possible to avoid the attenuation of the output current of driver IC 1 through transmission line 2 and transmission line 6 and enable the signals from driver IC 1 to reach receiver IC 7.

Incidentally, transmission line 2 and transmission line 6 have the same length.

Next, the value as set for capacitor 3 will be explained.

The capacitance value C of the capacitor is set to satisfy the following relational equations, $$Z_0 = \{R_Z^2 + (1/\omega^2 C^2)\}^{1/2} \tag{7}$$

$$C = \omega^{-1}(Z_0^2 - R_Z^2)^{-1/2} \tag{8}$$

where $Z_0$ is the impedance of transmission line 2, $R_Z$ is the combined resistance value of transmission line 2 and capacitor 3, f is the frequency of the clock signal, and $\omega$ is the angular frequency $2\pi f$.

While there is no limitation to frequency f, the length of transmission line 2 must be shorter with higher frequency f. This is because, if transmission line 2 is longer, the parasitic capacitance of transmission line 2 becomes larger to increase the time required for switching the signal input to capacitor 3 from a low level to a high level, and therefore the signal input to capacitor 3 cannot follow a high frequency.

Next, a specific example of the above configuration of the signal relay circuit will be explained. In what follows, it is assumed that Vcc=2.5 V, Vdd=3.3 V, Vrmax=0.7 V, $I_{OL}=I_{OH}=4$ mA, $I_R=1$ μA, f=100 MHz and impedance $Z_1$ of transmission line 6 is 50 Ω.

Relation R4>625 is obtained from the above equation (1) while relation 700K≧R5>825 is obtained from the above equation (4). Also, relation 700 K≧R5=R4>825 is obtained from the above equation (6).

Furthermore, if $Z_0$=50 Ω and $R_Z$=0.04 Ω as design values, the capacitance value C of capacitor 3 is calculated as 0.32 pF from the above equation (8).

Next, the results of experiments will be explained for comparing the received waveforms of clock signals as received by the receiver IC through the signal relay circuit according to the present invention and the corresponding received waveforms without the use of the signal relay circuit according to the present invention. The signal relay circuit according to the present invention and used in the experiments had the same configuration as described in the above specific example.

First, the exemplary configuration used in the experiments without the signal relay circuit according to the present invention will be explained.

Figure 3:
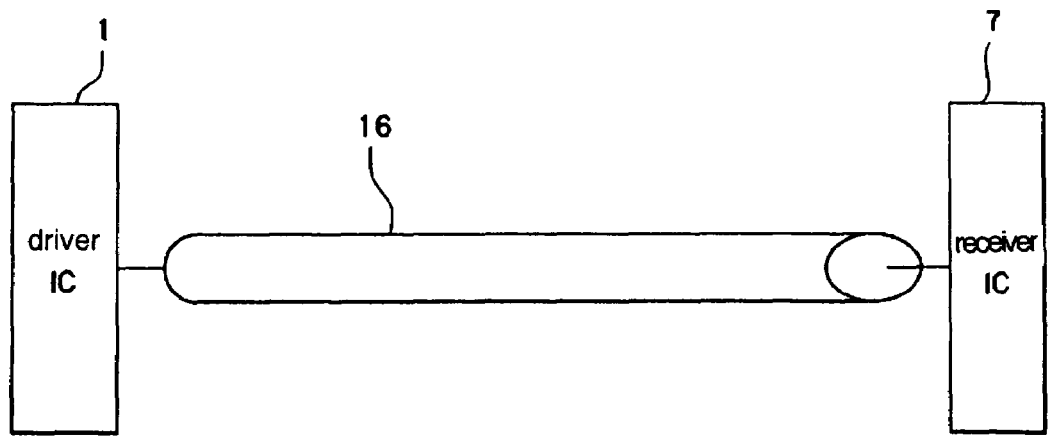
FIG. 3 is a block diagram showing an exemplary structure in which the signal relay circuit of the present invention is not provided.

FIG. 3 is a block diagram showing the exemplary configuration without the signal relay circuit according to the present invention. Line length $L_{16}$ of transmission line 16 for connecting driver IC 1 and receiver IC 7 has a relationship with line length $L_2$ of transmission line 2 and line length $L_6$ of transmission line 6 in accordance with the following equation, $$L_2 + L_6 = 1.5 \times L_{16} \tag{9}$$

It will be understood from equation (9) that the length of transmission line 16 is about 70% of the sum of the lengths of transmission line 2 and transmission line 6.

Figure 4:
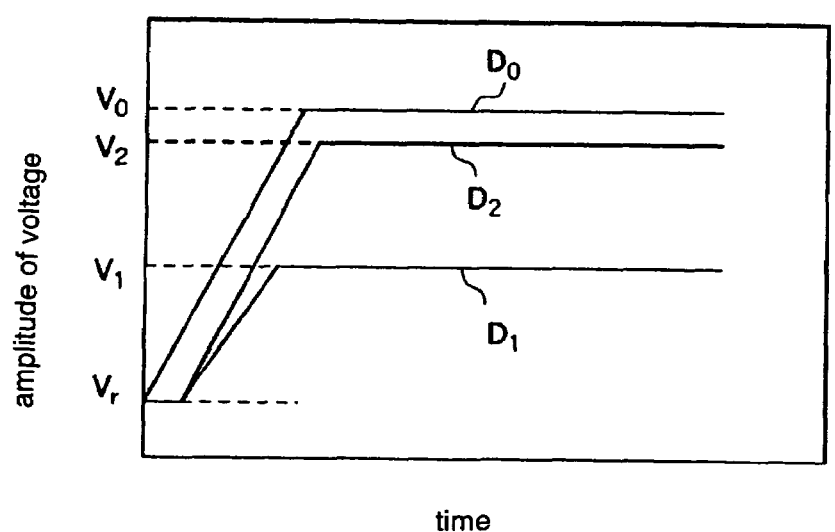
FIG. 4 is a graphic diagram showing the received waveforms of a receiver IC.

FIG. 4 is a graphic diagram showing the waveforms of signals received by the receiver IC. The abscissa is time T while the ordinate is the amplitude of voltage V of the received waveforms. In this case, it is assumed that $V_0$=Vcc=2.5 V where $V_0$ is the amplitude of voltage of expected waveform $D_0$ which is the received waveform in the case where a high level signal is input to the receiver IC in an ideal condition. Also, it is assumed that the minimum level of the input potential which can be judged by receiver IC 7 as the high level is 2 V. Furthermore, in FIG. 4, the minimum value of the amplitude of voltage of each waveform is adjusted to agree with Vr of receiver IC 7 for the purpose of facilitating the comparison of the respective amplitude of voltages.

As illustrated in FIG. 4, in the case where the signal relay circuit according to the present invention was not provided, amplitude of voltage $V_1$ of received waveform $D_1$ was 50% of $V_0$, i.e., 1.25 V. When received waveform $D_1$ is considered to oscillate with center of 1.25 V which is a half Vcc, the high voltage output through transmission line 16 is calculated as 1.25+(1.25/2)=1.875 V, which is smaller than the above minimum level, i.e., 2 V. For this reason, receiver IC 7 cannot detect the high level.

Contrary to this, in the case where the signal relay circuit according to the present invention was used, amplitude of voltage $V_2$ of received waveform $D_2$ was 2.25 V, which was a 10% attenuated level of $V_0$. When received waveform $D_2$ is considered to oscillate with center of 1.25 V which is a half Vcc, the high voltage output through transmission line

6 is calculated as 1.25+(2.25/2)=2.375 V, which is larger than the above minimum level, i.e., 2 V. For this reason, receiver IC 7 can detect the high level. On the other hand, the potential of the low level is calculated as 1.25−(2.25/2)=0.125 V, which is smaller than maximum value Vrmax, i.e., 0.7 V, of potential Vr which receiver IC 7 judges to be the low level. For this reason, receiver IC 7 can also detect the low level.

From the above results, it was confirmed that, by providing the signal relay circuit according to the present invention in the middle of a transmission line, receiver IC can receive an amplitude of voltage near the expected value to secure a sufficient amplitude for transmitting signals.

Incidentally, while power supply 8 serves to supply power potential Vcc of receiver IC 7, a higher potential can also be supplied.

Also, driver circuit IC 1 and receiver IC 7 may be semiconductor integrated circuits designed in conformity with an input interface standard such as HSTL (High-Speed Transistor Logic), LVTTL (Low Voltage Transistor Transistor Logic), LVDS (Low Voltage Differential Signaling), ECL (Emitter-Coupled Logic), PECL (Positive Emitter-Coupled Logic) and so forth.

While a preferred embodiment of the present invention has been described using specific terms, such description is for illustrative purposes only, and it is to be understood that changes and variations may be made without departing from the spirit or scope of the following claims.

What is claimed is:

1. A signal relay circuit for relaying a digital signal transmitted from a signal generating unit to a signal receiving unit and having a first potential level and a second potential level that is higher than said first potential level, said circuit comprising:
    a capacitor connected between said signal generating unit and said signal receiving unit for receiving digital signal, eliminating a DC component from said digital signal as received, and outputting the digital signal, from which said DC component is eliminated, to said signal receiving unit as a restored digital signal;
    a first resistor having one terminal connected to a power supply which pulls up the potential of said restored digital signal as received from said capacitor and the other terminal connected to a relay point between said capacitor and said signal receiving unit, and having a resistance value with which a current flowing through said first resistor is smaller than an output current of said first potential level from said signal generating unit; and
    a second resistor having one terminal connected to said relay point and the other terminal connected to a ground potential, and having a resistance value with which a current flowing through said second resistor is smaller than an output current from said signal generating unit having said second potential level.

2. The signal relay circuit as claimed in claim 1 wherein
    the resistance value of said second resistor is selected in order that the maximum value of said first potential level is not exceeded by the voltage drop due to a leakage current that is flowing from said signal receiving unit into said ground potential.

3. The signal relay circuit as claimed in claim 1 wherein when the power voltage of said signal receiving unit is equal to that of said power supply, the resistance value of said first resistor is equal to that of said second resistor.

4. The signal relay circuit as claimed in claim 1 wherein when a transmission line is provided between said signal generating unit and said capacitor,
    the capacitance value C of said capacitor is selected to satisfy the relational equation, $$C = \omega^{-1}(Z_0^2 - R_Z^2)^{-1/2}$$

where $R_Z$ is the combinational resistance value of said transmission line and said capacitor, $Z_0$ is the impedance of said transmission line, f is the frequency of said digital signal, and ω is the angular frequency $2\pi f$.

* * * * *